US012157305B2

(12) United States Patent
Ramesh et al.

(10) Patent No.: US 12,157,305 B2
(45) Date of Patent: Dec. 3, 2024

(54) SYSTEM AND METHOD FOR PREDICTING INOPERATIVE INKJETS WITHIN PRINTHEADS IN AN INKJET PRINTER

(71) Applicant: Xerox Corporation, Norwalk, CT (US)

(72) Inventors: Palghat S. Ramesh, Pittsford, NY (US); Qingyu Yang, West Lafayette, IN (US)

(73) Assignee: Xerox Corporation, Norwalk, CT (US)

( * ) Notice: Subject to any disclaimer, the term of this patent is extended or adjusted under 35 U.S.C. 154(b) by 281 days.

(21) Appl. No.: 17/854,184

(22) Filed: Jun. 30, 2022

(65) Prior Publication Data

US 2024/0001669 A1 Jan. 4, 2024

(51) Int. Cl.
*B41J 2/045* (2006.01)
*B41J 29/393* (2006.01)

(52) U.S. Cl.
CPC ........... *B41J 2/0451* (2013.01); *B41J 2/0458* (2013.01); *B41J 2/04581* (2013.01); *B41J 29/393* (2013.01)

(58) Field of Classification Search
CPC ........ B41J 2/165; B41J 29/393; B41J 19/145; B41J 2/2135; B41J 11/46; B33Y 50/02; G06N 20/00; G06K 15/027
See application file for complete search history.

(56) References Cited

U.S. PATENT DOCUMENTS

| | | | | |
|---|---|---|---|---|
| 8,363,261 | B1 * | 1/2013 | Zimmerman | B41J 2/16585 347/14 |
| 2011/0242186 | A1 * | 10/2011 | Mizes | B41J 2/2142 347/19 |
| 2014/0112695 | A1 * | 4/2014 | van Dijk | B41J 11/66 400/621 |
| 2015/0097886 | A1 * | 4/2015 | Ohnishi | B41J 2/2135 347/14 |
| 2016/0288527 | A1 * | 10/2016 | Hasegawa | B41J 2/2103 |
| 2016/0368264 | A1 * | 12/2016 | Osakabe | B41J 2/0451 |
| 2019/0118258 | A1 * | 4/2019 | Sachs | B29C 64/393 |
| 2019/0160809 | A1 * | 5/2019 | Neeb | B41J 2/0451 |
| 2020/0361203 | A1 * | 11/2020 | Kurane | B41J 2/0451 |
| 2020/0361210 | A1 * | 11/2020 | Sato | G06N 3/084 |
| 2021/0016564 | A1 * | 1/2021 | Yamagishi | B41J 2/04581 |
| 2021/0283923 | A1 * | 9/2021 | Moribe | H04N 1/605 |
| 2022/0063281 | A1 * | 3/2022 | Kidera | B41J 2/16535 |

* cited by examiner

*Primary Examiner* — John Zimmermann
(74) *Attorney, Agent, or Firm* — Maginot Moore & Beck LLP

(57) ABSTRACT

A method of inkjet printer operation indicates a need for a remedial printhead operation by predicting a number of inoperative inkjets and locations for the inoperative inkjets in at least one printhead in the inkjet printer at a predetermined time. The prediction is made using Markov chain Monte Carlo models that correspond to different ranges of area coverage density for inkjet areas of a printhead.

20 Claims, 19 Drawing Sheets

404

| Model ID # | Type 1 AC: (0-25)% | Type 2 AC: (25, 50)% | Type 3 AC: (50, 75)% | Type 4 AC: (75, 100)% |
|---|---|---|---|---|
| Cyan | C-1 | C-2 | C-3 | C-4 |
| Magenta | M-1 | M-2 | M-3 | M-4 |
| Yellow | Y-1 | Y-2 | Y-3 | Y-4 |
| Black | K-1 | K-2 | K-3 | K4 |

*FIG. 4B*

$$Prediction_{grid} = 1\ for\ P_{grid}(1) > 0.5\ \ = 0\ for\ P_{grid}(1) < 0.5$$

$$GT_{grid} = 1\ if\ any\ inkjet\ is\ inoperative\ in\ grid;\ 0,\ o.\ w$$

SYSTEM AND METHOD FOR PREDICTING INOPERATIVE INKJETS WITHIN PRINTHEADS IN AN INKJET PRINTER

TECHNICAL FIELD

This disclosure is directed to printheads that eject liquid ink to form ink images on substrates as they pass the printheads and, more particularly, to methods for predicting the occurrence of inoperative inkjets in such printheads.

BACKGROUND

Inkjet printers eject liquid ink drops from printheads to form ink images on an image receiving surface passing through the printers. The printheads include a plurality of inkjets that are arranged in some type of array. Each inkjet has a thermal or piezoelectric actuator that is coupled to a printhead driver. The printhead controller generates firing signals that correspond to ink image content data for producing ink images on media passing through the printers. The actuators in the printheads are positioned with respect to ink chambers in the printheads so when the actuators respond to the firing signals they expand into an ink chamber to eject ink drops onto passing media and form an ink image that corresponds to the ink image content data used to generate the firing signals.

Inkjets, especially those in printheads that eject aqueous inks, need to regularly fire to help prevent the ink in the nozzles formed in the faceplates of the printheads from drying. If the viscosity of the ink increases too much, the probability of an inkjet failure increases substantially. During the printing of a print job, sheets are printed with test pattern images at predetermined intervals to evaluate the operational status of the inkjets. An optical sensor generates digital image data of these test pattern images and this digital image data is analyzed by the printer controller to determine which inkjets, if any, that were operated to eject ink into the test pattern did in fact do so, and if an inkjet did eject an ink drop whether the ejected drop had an appropriate mass and the drop landed where it was supposed to land. Any inkjet nozzle not ejecting an ink drop it was supposed to eject or ejecting a drop not having the right mass or landing at an errant position is called an inoperative inkjet in this document. The controller stores data in a database operatively connected to the controller that identifies the inoperative inkjets in each printhead. The sheets printed with the test patterns are sometimes called run-time missing inkjet (RTMJ) sheets and these sheets are discarded from the output of the print job.

Inoperative inkjets can form streaks in the ink images produced by inkjet printers. The number of inoperative inkjets in a printhead typically increases over time and the printhead needs to be purged on some recurring basis to recover the inoperative inkjets to maintain the quality of the ink images at an adequate level. The method of detecting inoperative inkjets from images of test patterns printed on RTMJ sheets during print jobs is time-consuming and a waste of ink, which affects the overall productivity and cost of the inkjet printer. Being able to predict the occurrences of inoperative inkjets without recourse to the printing of test patterns on RTMJ sheets and the analysis of the image data of test patterns on RTMJ sheets would be beneficial.

SUMMARY

A new method of operating an inkjet printer predicts the occurrences of inoperative inkjets to determine when printhead purging should be performed before image quality is adversely impacted. The method includes predicting a number of inoperative inkjets and locations of the inoperative inkjets in at least one printhead in the inkjet printer at a predetermined time, and generating a signal indicating the at least one printhead requires remedial action when the number of inoperative inkjets exceeds a predetermined threshold or the locations of the inoperative inkjets prevent implementation of inoperative inkjet compensation.

A new inkjet printer predicts the occurrences of inoperative inkjets to determine when printhead purging should be performed before image quality is adversely impacted. The inkjet printer includes at least one printhead having a plurality of inkjets, and a controller operatively connected to the printhead. The controller is configured to predict a number of inoperative inkjets and locations of the inoperative inkjets in at least one printhead in the inkjet printer at a predetermined time, and generate a signal indicating the at least one printhead requires remedial action when the number of inoperative inkjets exceeds a predetermined threshold or the locations of the inoperative inkjets prevent implementation of inoperative inkjet compensation.

BRIEF DESCRIPTION OF THE DRAWINGS

The foregoing aspects and other features of operating an inkjet printer to predict the occurrences of inoperative inkjets so printhead purging can be performed before image quality is adversely impacted are explained in the following description, taken in connection with the accompanying drawings.

FIG. 4A shows a process flow for producing a model for predicting inoperative inkjets in a printhead over time and a process flow for using the model in a printer and FIG. 4B is a table showing the different area coverage density ranges for each printhead shown in FIG. 4A.

DETAILED DESCRIPTION

Figure 1A:
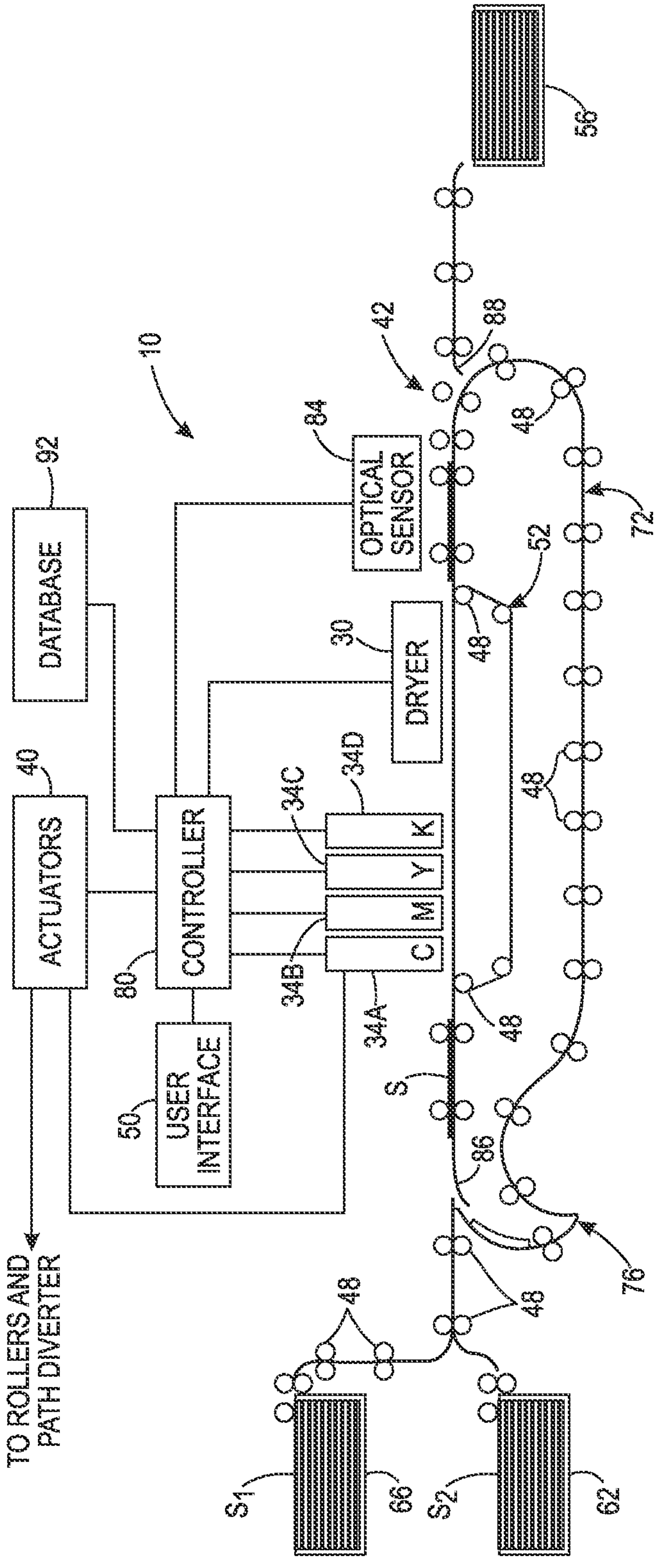
FIG. 1A depicts an inkjet printer that uses the number of inoperative inkjets and their locations predicted by a Markov Chain Monte Carlo model to determine inoperative inkjet compensation schemes and when remedial printhead maintenance should be performed before image quality is adversely impacted.

For a general understanding of the environment for the system and method disclosed herein as well as the details for the system and method, reference is made to the drawings. In the drawings, like reference numerals have been used throughout to designate like elements. As used herein, the word "inkjet printer" encompasses any apparatus that produces ink images on media by operating inkjets in printheads to eject drops of ink toward media passing by the printheads. As used herein, the term "process direction" refers to a direction of travel of the media on which the ink images are being formed and the term "cross-process direction" is a direction that is substantially perpendicular to the process direction along the surface of the media.

Figure 2:
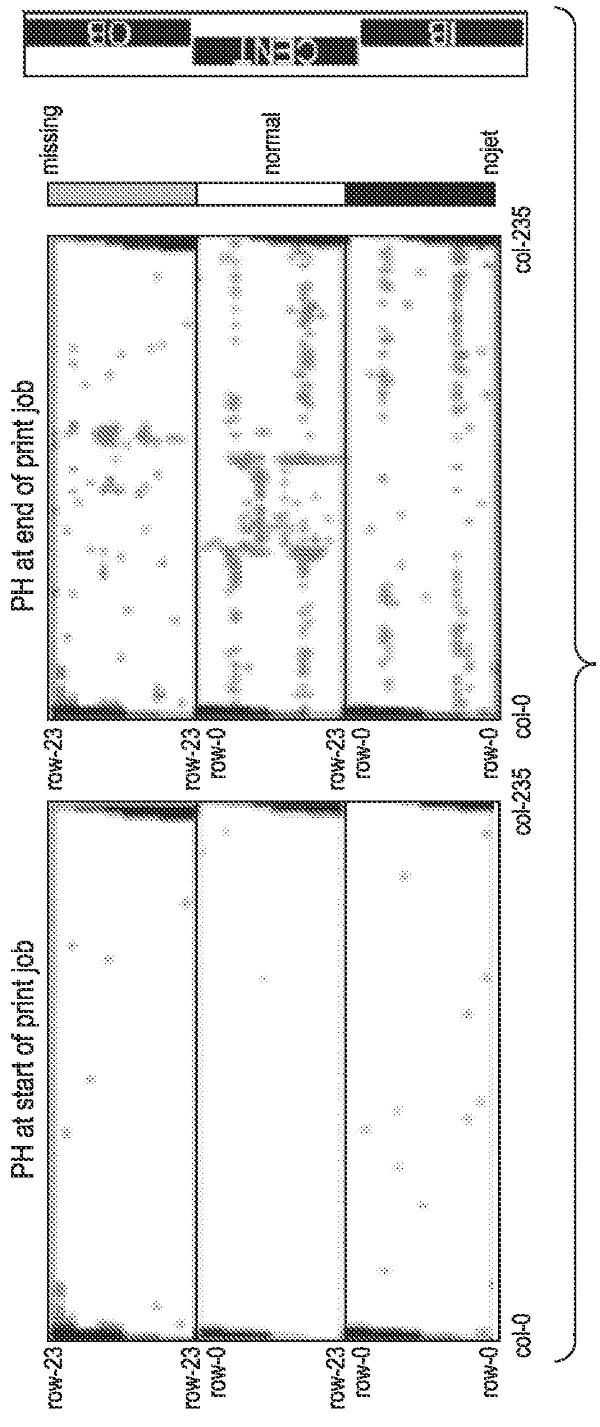
FIG. 2 depicts a distribution of inoperative inkjets in three printheads of a printhead module before and after a print job.

The printer and method described below use machine learning techniques for developing spatio-temporal models to predict when and where inoperative inkjets are likely to occur. A successful prediction system helps the controllers of inkjet printers to operate the inkjet printers more intelligently during customer jobs. Empirical digital image data of previously printed images and the analysis of that digital image data to identify inoperative inkjets suggests that the distribution of inoperative inkjets in the printheads varies with respect to the ink color ejected by the printheads and the ink coverage area density in the images printed by the printheads. Additionally, these data show that the inkjets in the neighborhood of the inoperative inkjets have a greater likelihood of becoming inoperative before any corrective actions are taken. These propositions were validated by correlating identified inoperative inkjets with typical customer job parameters as a function of time. The customer job parameters include, but are not limited to image characteristics such as whether the printed portions of the images were solids, text, office graphics, blanks, and the like. FIG. 2 shows such a visualization of inoperative inkjets in the black ink ejecting printheads of a printhead module during a printing process in the form of printhead maps. A legend to the right of the printhead maps shows the symbols indicative of inoperative inkjets, operational inkjets, and the absence of inkjets in a faceplate of a printhead. The three printheads are configured in a printhead module as depicted to the right of the legend. The three leftmost printhead maps depict the locations of inoperative inkjets in the faceplates of the three printheads at the start of a print job and the three rightmost printhead maps depict the locations of inoperative inkjets in the faceplates of the three printheads at the end of the print job.

Figure 3:
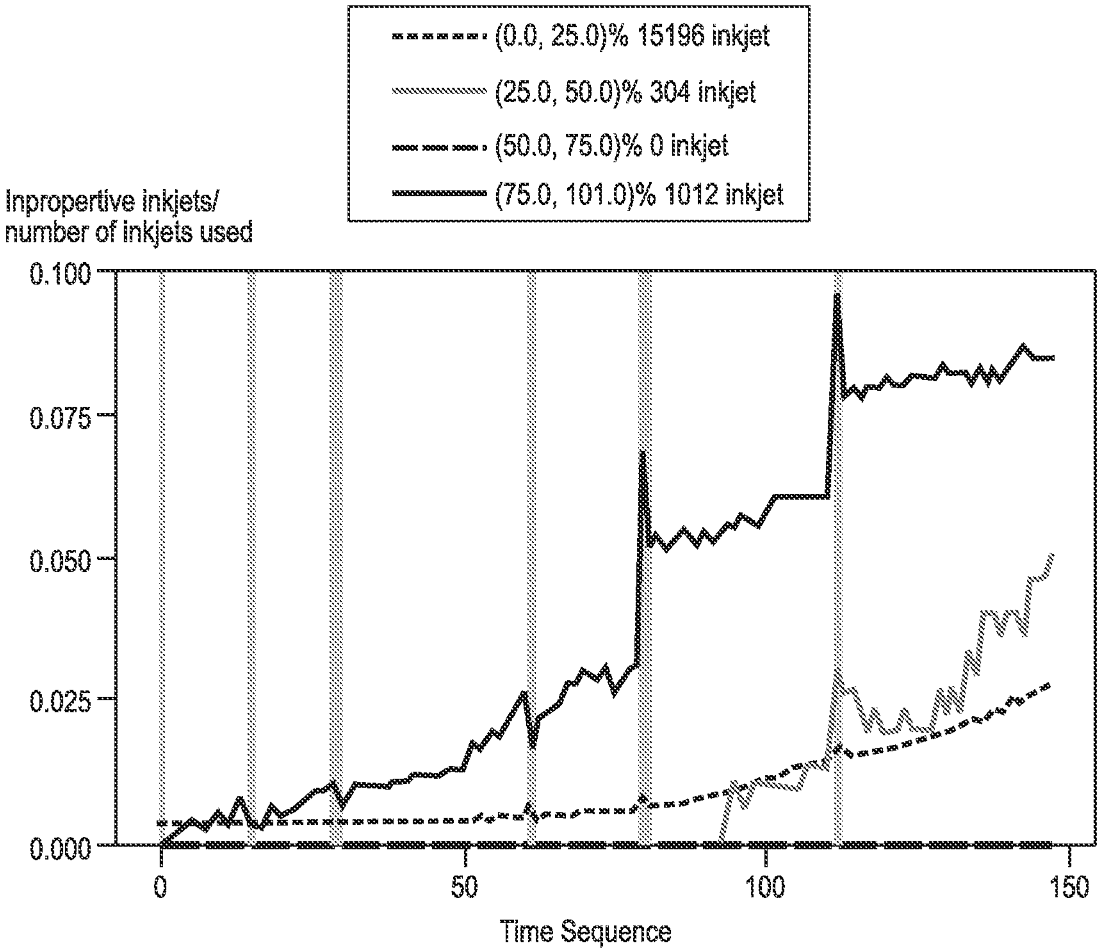
FIG. 3 is a graph of the number of inoperative inkjets occurring in four different area coverage percentage ranges.

FIG. 3 is a graph of empirical data that shows the number of inoperative inkjets as a function of time for four different levels of ink area coverage density, namely, zero up to 25% area coverage density, 25% up to 50% area coverage density, 50% up to 75% area coverage density, and 75% to 100% area coverage density. This graph shows that the inkjets used to print less dense coverage areas have a larger number of inoperative inkjets since the inkjets are used less frequently. These blocks for quantization of the printhead coverage area into sequential area and the building of a prediction model for each block is merely exemplary as other blocks with corresponding prediction models are possible.

These graphs show that the occurrence of inoperative inkjets in a printhead can be modeled with stochastic and probabilistic methods. The system and method described below model the evolution of the occurrence of inoperative inkjets in a printhead during a print job and predict the inkjet states, that is, operational or inoperative, in the future at both the printhead level and nozzle level. At the printhead level, the task of predicting the number of inoperative inkjets over time is based on the distribution of ink area coverage densities formed with each printhead in a printed image. At the nozzle level, the likelihood of an individual nozzle transitioning from operative to inoperative as well as the nozzles in a small neighborhood around each nozzle is predicted using a model developed using digital image data of the media printed during previously performed print jobs in inkjet printers. This digital image data of the previously printed media is generated by the optical systems used to analyze the test patterns printed on RTMJ sheets. Based on the inoperative inkjet data determined from this digital image data, an online learning system or model was developed that predicts the number of inoperative inkjets at future K times during a print job. This model is used during the printing process by retraining the model with the latest area coverage density data derived from the image content data used to operate the printheads to better fit the changes occurring in the inkjet transitions.

Figure 4A:
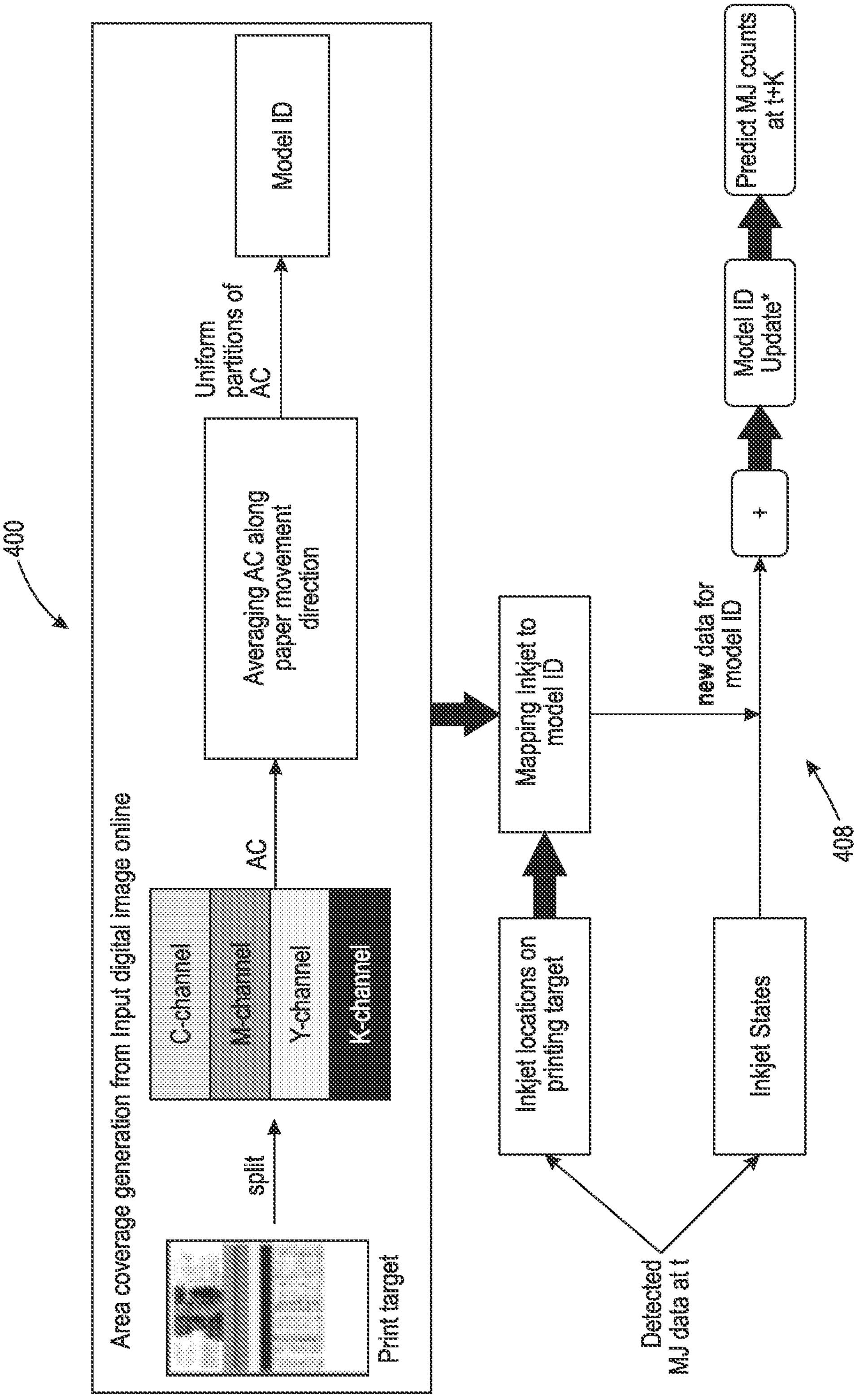

FIG. 4A shows the overall pipeline 400 of training and inference to produce an inoperative inkjet prediction model using an incoming stream of area coverage density data derived from the image content data used to operate the inkjets in the printheads. A prediction model is used for each ink color and the different area coverage density ranges for each printhead as shown in the table 404 of FIG. 4B. The process 408 of FIG. 4A shows that once the new image content data is evaluated, every inkjet is mapped to its corresponding model based on a calculation of mean area coverage density printed by the inkjet since the last prediction. Also, the new area coverage density data is added to the corresponding model and the prediction model for the corresponding model is updated. As used in this document, the term "prediction model" means a plurality of programmed instructions that when executed identify the operational status of each inkjet in an area of a printhead using the previous operational status of the inkjets in the area.

Figure 5:
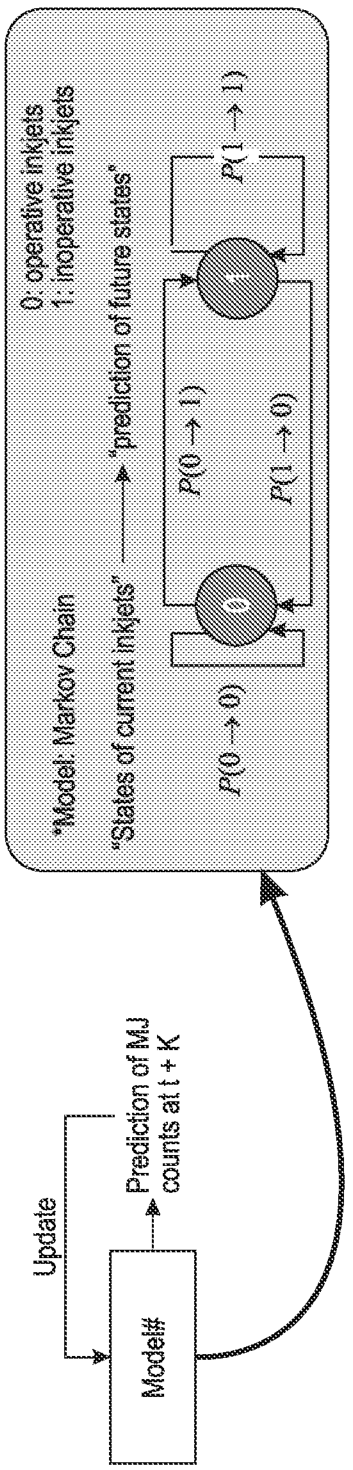
FIG. 5 depicts a first-order Markov chain Monte Carlo (MCMC) model used to generate the transition probabilities between two states, inoperative and operative, for the inkjets.

FIG. 5 shows a prediction model used to predict the transitions of inkjet states between operative and inoperative. It is a first-order Markov chain Monte Carlo (MCMC) method that generates the transition probabilities between two states, inoperative and operative. In the model, "0" represents the inkjets that are operative and "1" represents the inkjets that are inoperative, which are sometimes called missing inkjets or MJs in this document. The transition probabilities between the two states are the parameters in the model. The symbol $\tau$ is used to represent a transition matrix, where $$\tau = \begin{bmatrix} P_{00} & P_{01} \\ P_{10} & P_{11} \end{bmatrix}.$$

Figure 6:
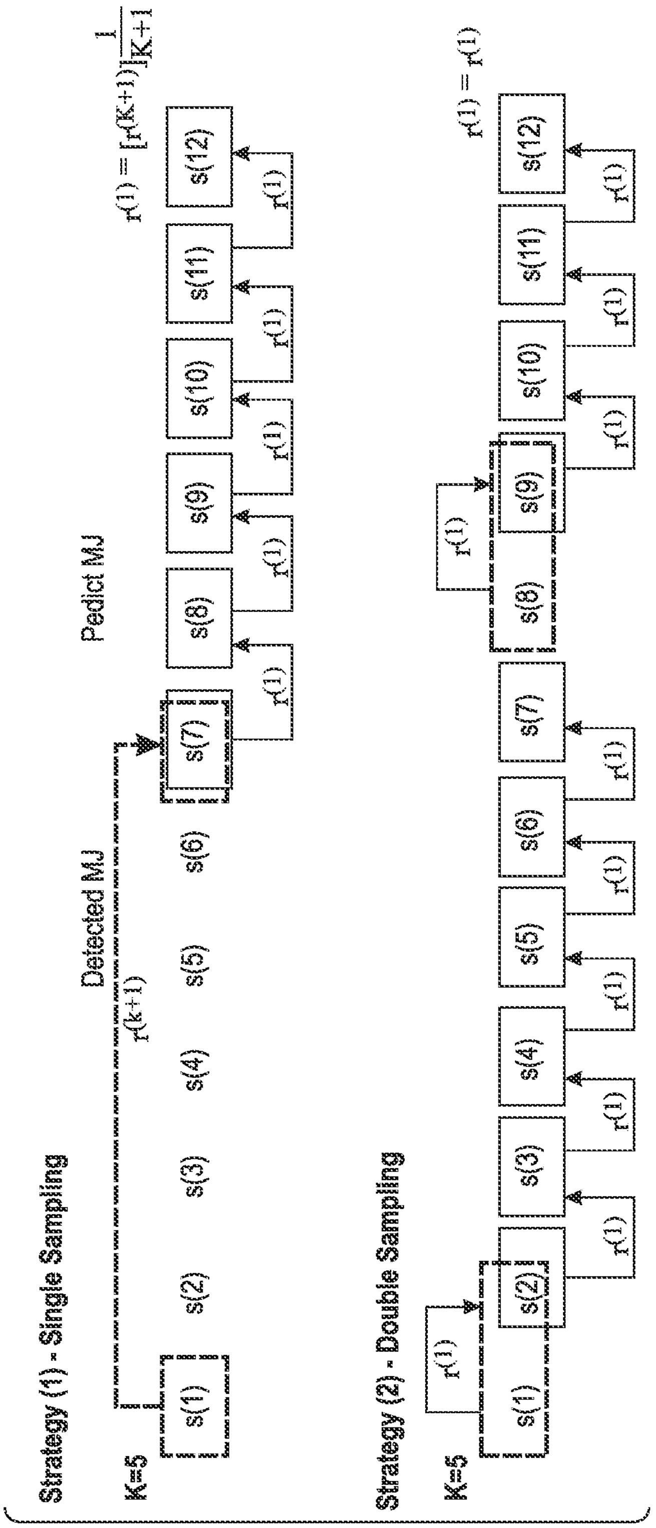
FIG. 6 depicts examples of two sampling strategies that can be used to realize online predictions for the model shown in FIG. 5.

In this matrix, $P_{s_{t-1},\ s_t}$ is the probability of the state at t−1 transits ($s_{t-1}$) to the next state $s_t$. $\tau^1$ is the transition matrix between a one-step transition. For a double sampling strategy, a pair of inkjet states at t−1 and t come into the model together for estimating the new single transitions that update the model $\tau^1$. The transition matrix $\tau^1$ is then used to predict the inkjet states at t+1, . . . , t+K. This double sampling strategy gets the one-step transition directly, but the data collection system is difficult to schedule automatically. A single sampling strategy, which keeps the same intervals to schedule the inoperative inkjet data collection, is easier to schedule. The matrix $\tau^{K+1}$ is the transition matrix between the K+1 transitions, K is the number of the conventionally scheduled times that are replaced by the model predictions. Thus, the inoperative inkjet data collected at t and t+K+1 gives the multiple transition matrix $\tau^{K+1}$. Based on the derived relationship of $\tau^{K+1}$ and $\tau^1$, $$\tau^{(1)} = \left[\tau^{(K+1)}\right]^{\frac{1}{K+1}},$$

the single transition matrix can be updated to predict the inkjet states at t+1, . . . , t+K. FIG. 6 shows the examples of using the two sampling strategies to realize online predictions with K=5.

Figure 7A:
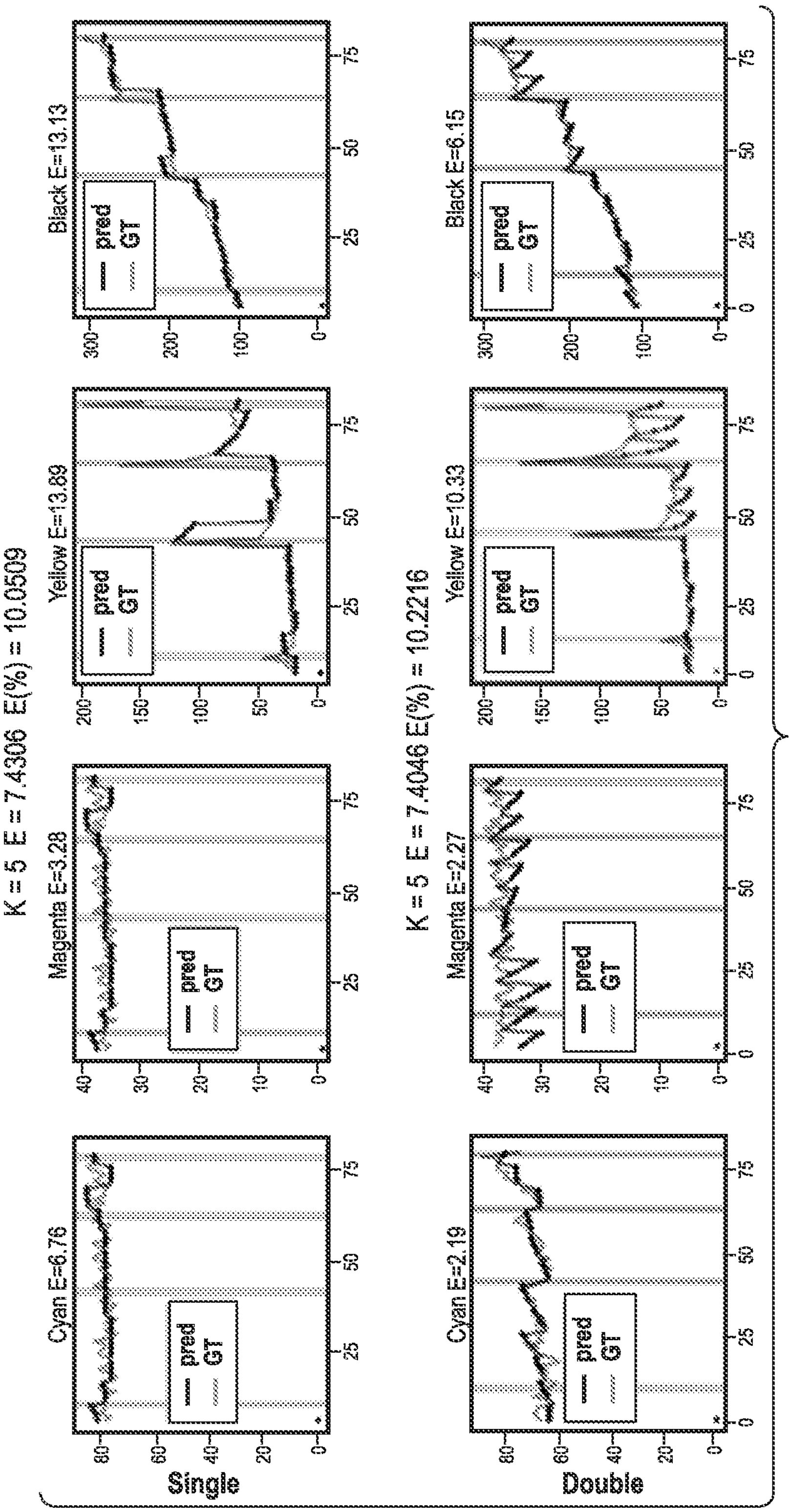
FIG. 7A depicts the prediction results for the inoperative inkjet counts using the two sampling strategies shown in FIG. 6.
Figure 7B:
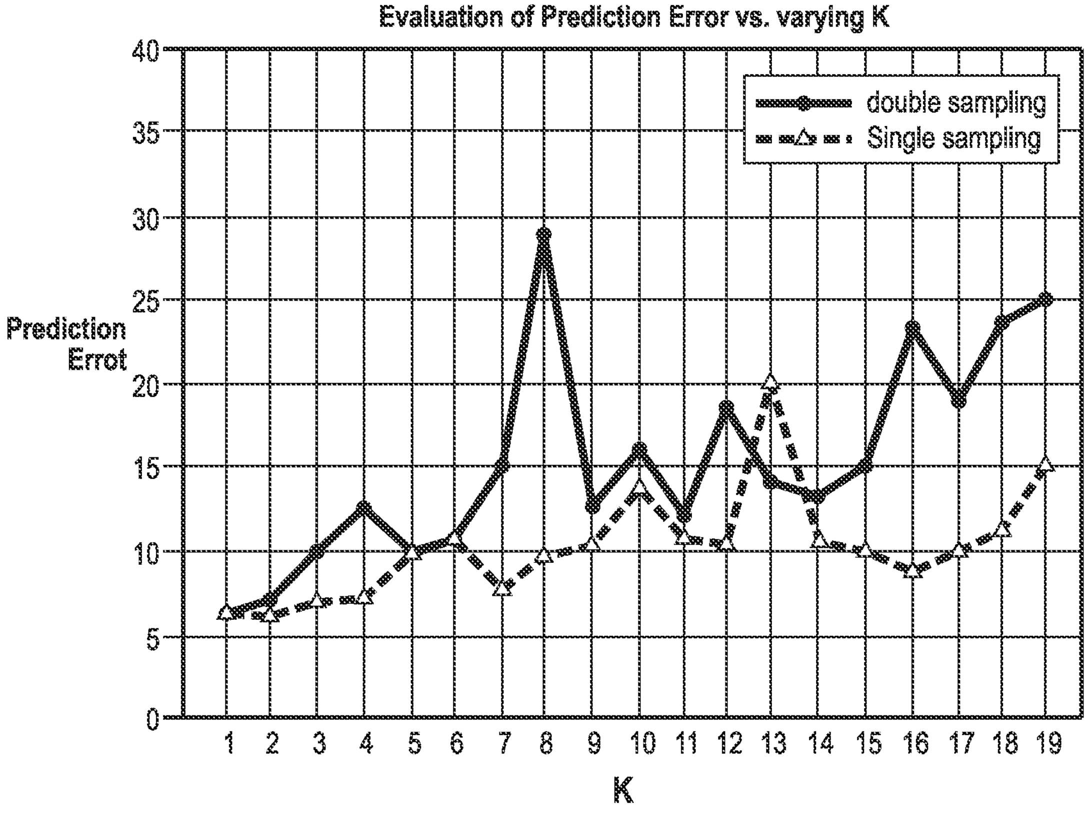
FIG. 7B is a graph of a comparison of the results of the two sampling strategies for different settings.

The left plots in FIG. 7A show the prediction results for the inoperative inkjet counts using the two sampling strategies. With K=5, the mean absolute error (MAE) is around 7 inoperative inkjets and the error in percentage (MAPE) is around 10%. In general, the predictions track the ground truth well as printing time increases. The graph in FIG. 7B shows a comparison of two sampling strategies and the results of the average of MAE with different settings and varying K. The results show that the single sampling strategy achieves a lower MAE and higher accuracy. Since the single sampling strategy is also easier to schedule during a printing process and needs around half of the input data than the double sampling strategy, a single sampling strategy is used in the prediction model to achieve improved ink usage and time consumption. This single sampling strategy is used in the prediction model described in the remainder of this document and this model is called the "standard MY" model.

Figure 8A:
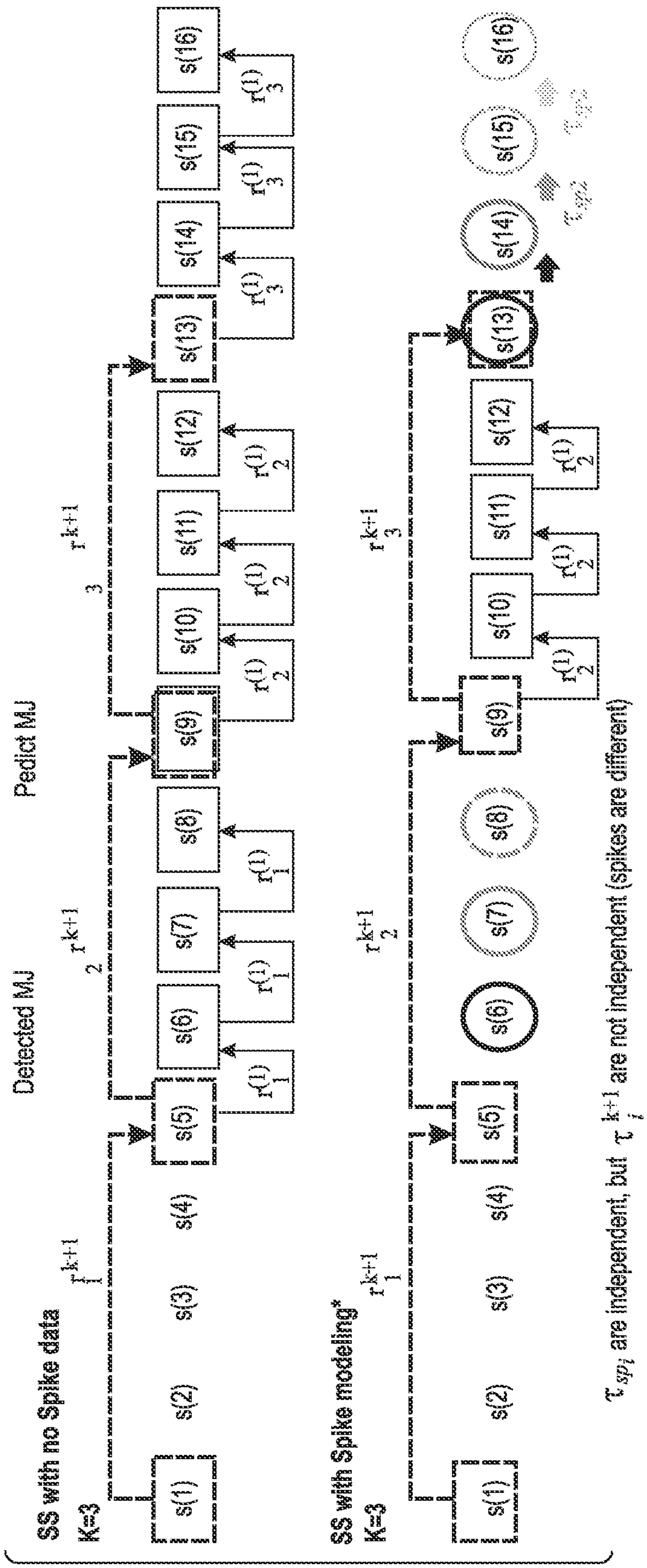
FIG. 8A depicts a strategy for modeling spikes corresponding to print job interruptions in the standard model of FIG. 5.
Figure 8B:
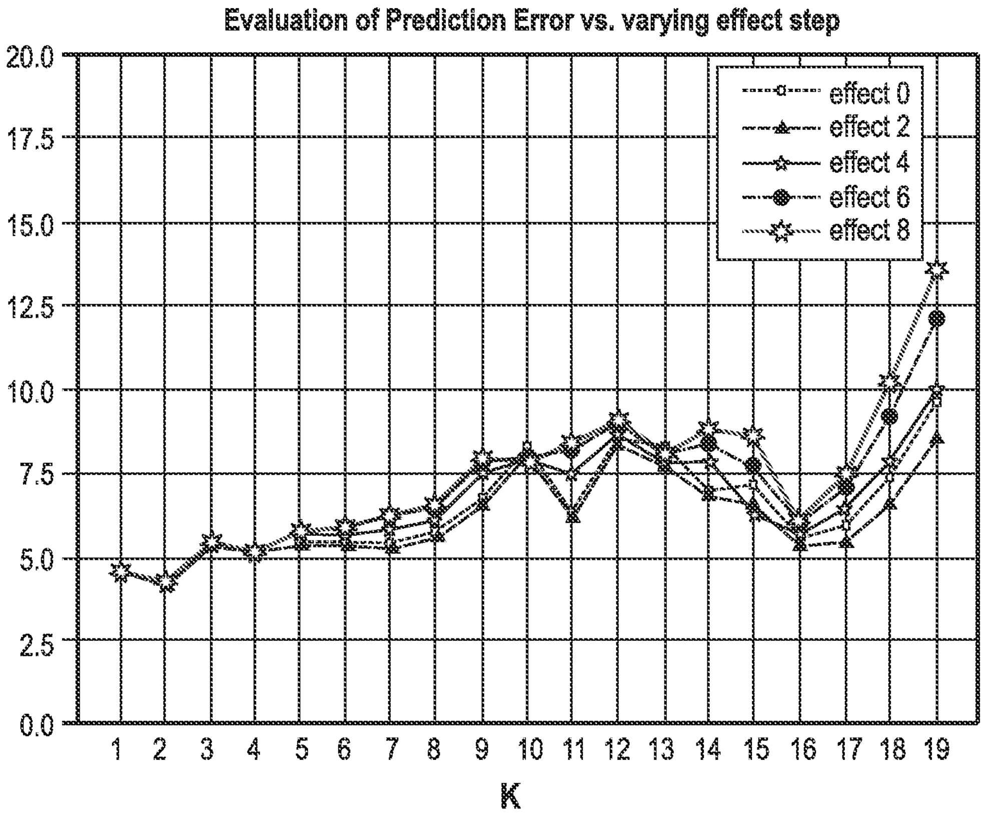
FIG. 8B is a graph showing the results of experiments used to determine when the effects of spikes dissipate from the standard model of FIG. 5.

The standard MJ model is effective as long as the printer is operating; however, unscheduled printing interruptions do occur. Printing interruptions, such as paper jams, are often inevitable during a printing process and they affect the transitions in the inkjet status states. The inkjet status state transitions occurring after printing interruptions do not follow the prior transition behaviors and the inoperative inkjet counts often increase following a printing interruption. Thus, a spike in the time-series data results so these spikes require an adjustment of the standard MJ model. The strategy for modeling spikes in the standard MJ model is shown in FIG. 8A. When unscheduled interruptions occur, an additional spike model is updated and used to predict inoperative inkjets independently of the standard MJ model. Immediately following a printing interruption, the inoperative inkjet status data is collected at time t after interruption and at time t+1. The transition between the two states is used to update the spike model. The spike model is used to predict the subsequent e times (e being defined as the data collection times affected by a spike). Following the e times, use of the standard MJ resumes. The graph in FIG. 8B shows the results of experiments used to determine the value of e. The graph shows the prediction error is the smallest when e equals to 2. This error minimization implies that the number of times influenced by a printing interruption is around 2.

Figure 9A:
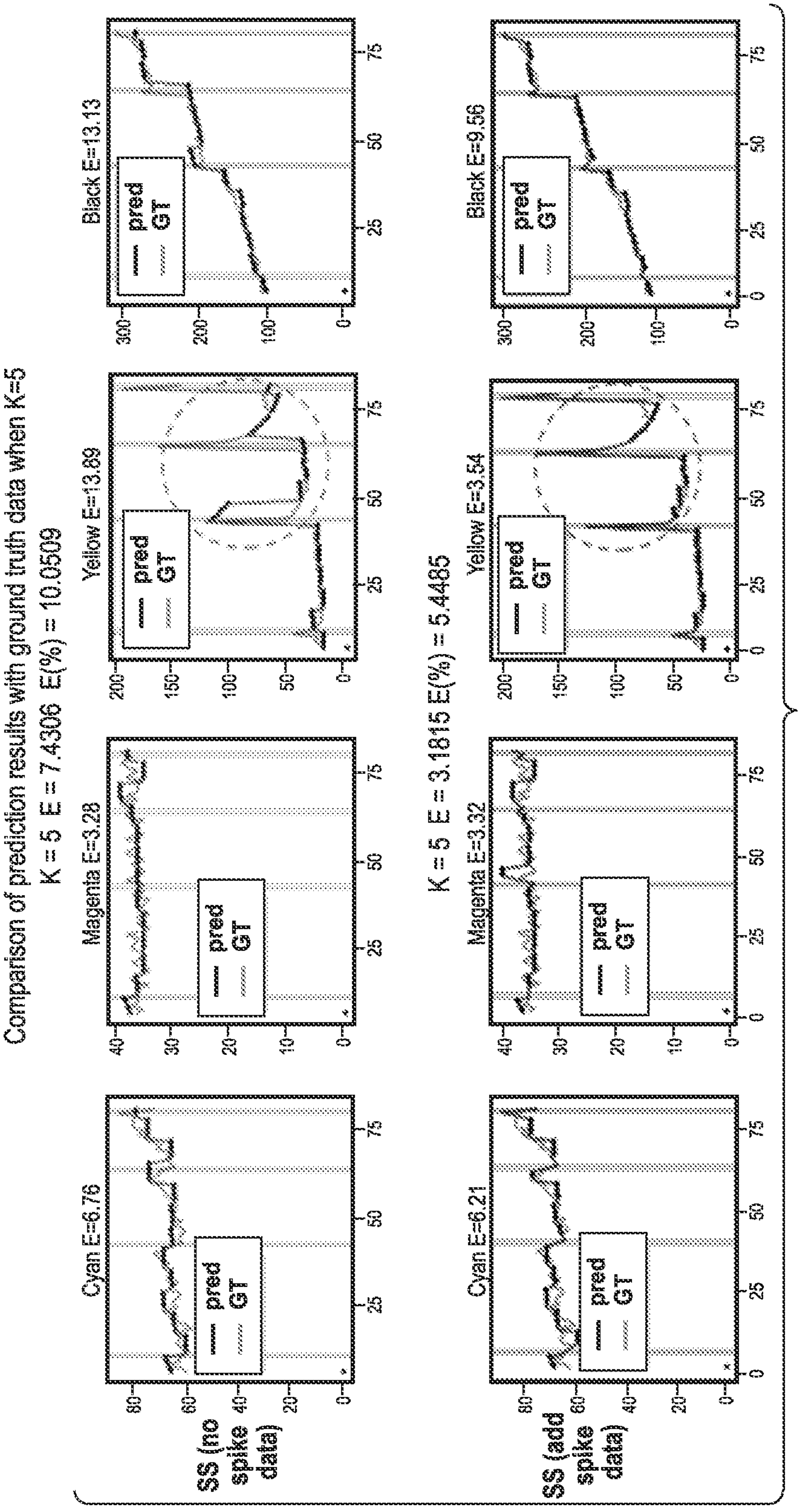
FIG. 9A depicts plots that compare the results using only the standard model of FIG. 5 predictions with the ground truth and the results of combining the standard model of FIG. 5 with spike modeling of FIG. 8A against the ground truth.
Figure 9B:
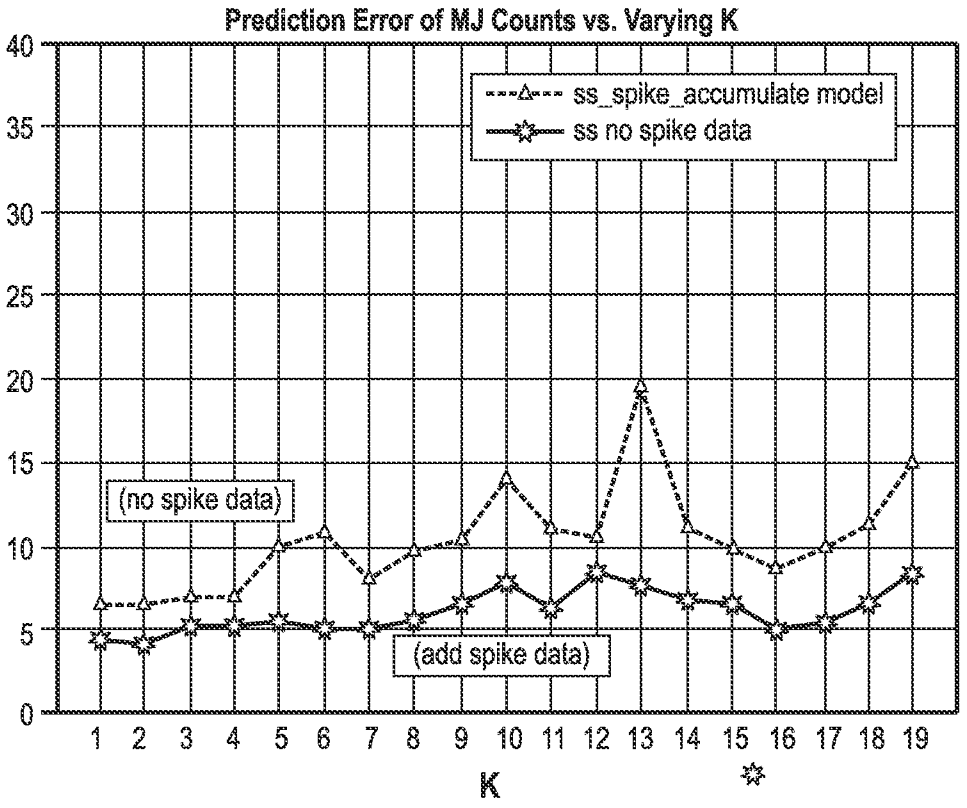
FIG. 9B is a graph that shows the mean absolute prediction error (MAE) for the model results shown in FIG. 9A.

The plots in FIG. 9A compare the results using only the standard MJ model predictions with the ground truth (GT) and the results of combining the standard MJ model with spike data modeling against the ground truth. In the graphs of FIG. 9A, E is the average MAE while E (%) is the average MAPE. This comparison shows the simultaneous addition of spike modeling in the standard MJ model significantly reduces the prediction error. The best prediction results were achieved with a single sampling strategy and additional spike modeling as shown by the spike line in the graph of FIG. 9B. In FIG. 9B, the mean absolute prediction error (MAE) is shown for different values of K. In this graph, the value of K=7 keeps the prediction error around 5% in MAE. These results show the standard MJ model using additional spike modeling can replace 6 out of 7 (around 85%) of conventional inoperative inkjet detections made by analyzing test patterns on RTMJ sheets with a MAE around 5.

The model described thus far predicts the likelihood of inkjet counts during a print job. Such a prediction helps the printer schedule corresponding actions to prevent the appearance of streaks in printed images and ensure adequate image quality. The identification of which inkjets become inoperative during a print job is equally important since the neighboring inkjets can used to compensate for the absence of the ink that should have been ejected by the inoperative inkjets. The identification of which specific inkjets become inoperative is an extremely stochastic process and that identification is hard to predict at the inkjet level with a great degree of certainty. An alternative goal is to locate the regions of a printhead where inoperative inkjets are likely to occur.

The MCMC model described above is able to predict inoperative inkjet counts during a print job. To extend this model so it can predict the printhead regions where inkjets become inoperative, the model is modified to take into account the probability of inoperative inkjets with regard to different area coverage densities. Four types of area coverage (AC) density are defined within the range of 0-100% AC. For each inkjet at the i-th row and the j-th column of the printhead, the area coverage for future prints is calculated and the coverage density for the inkjet is mapped to its corresponding AC density type. The corresponding transition probabilities are:

$$\tau_{AC} = \begin{bmatrix} P_{00_{AC}} & P_{01_{AC}} \\ P_{10_{AC}} & P_{11_{AC}} \end{bmatrix},$$

in accordance with the MCMC model discussed above. In this modified model, at prediction time t, the probability of each inkjet becoming inoperative, which is represented as $(P(1)_{i,j}^{t})$, is based on the current transition probabilities and previous operational status of the inkjet. If the last data collection time, t−1, is at one of the scheduled incoming data times, the previous state is based on the area coverage densities derived from the incoming image content data; otherwise, the previous state is based on the prediction generated by the model according to the equation:

$$P(1)_{i,j}^{t}=P_{01_{AC}}^{t}*P(0)_{i,j}^{t-1}+P_{11_{AC}}^{t}*P(1)_{i,j}^{t-1}\text{ 1: inoperative; 0: operative}$$

This approach provides the probability of showing an inkjet becoming inoperative for each type of area coverage density and the probabilities are mapped to each location (i,j) on the printhead. Additionally, each inkjet's probability of transiting to inoperative also depends on the neighboring inkjet states. Thus, the printhead is partitioned into grids with the size of m by m. As used in this document, the term "grid" or "grid area" or "area of the grid" means an arrangement of a predetermined number of inkjets about a predetermined inkjet location in the printhead. Within each grid, the probability of at least one inkjet transitioning to an inoperative state is computed using the equation:

$$P(1)_{m*m\ grid}^{t}=1-\sum_{i,j=(i-m,j-m)}^{i,j=(i+m,j+m)}\left(1-P_{i,j}^{t}(1)\right)$$

Figure 10:
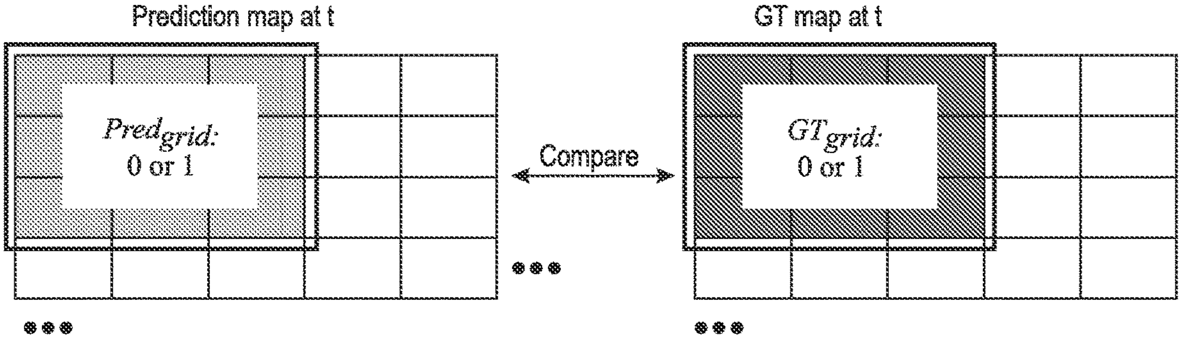
FIG. 10 shows the equation used to predict whether a grid has inoperative inkjets within a m by m grid, where m is an adjustable parameter and a comparison of the prediction map to a ground truth map identifying the grids having inoperative inkjets.

The prediction for a grid having inoperative inkjets is generated using a 0.5 threshold applied to the probability as shown in the equation of FIG. 10, although other thresholds can be used. In this manner, the prediction of inoperative inkjets occurring within a m by m grid, where m is an adjustable parameter, can be generated. To evaluate the modified model's performance, the prediction map of the modified model is compared to the ground truth map as shown in FIG. 10. Since the prediction map is generated on a lower-resolution printhead map, the resolution of the ground truth map is also reduced to determine whether there is at least one inoperative inkjet within the grid. Additionally, different sizes of grids can be used to produce different resolutions of the maps and a sliding window can also be used with the different sizes of grids on the original map to compute predictions and ground truth maps for comparison.

Inoperative inkjets are sparse in printhead maps as there are only a few dozen or hundreds of inoperative inkjets in an inkjet printhead having 16,632 inkjets. Since the data is imbalanced between inoperative inkjets and operative inkjets, a F1 score, which is defined by the following equation, is used to evaluate the performance of predicting $$\text{Precision}=\frac{\text{Truth Positives}}{\text{Truth Positives}+\textit{Fals}\text{ Positives}},$$

$$\text{Recall}=\frac{\text{Truth Positives}}{\text{Truth Positives}+\text{False Positives}},$$

$$F1\text{ score}=2*\frac{\text{Precision}*\text{Recall}}{\text{Precision}+\text{Recall}}$$

inoperative inkjet locations in a printhead. Grids containing inoperative inkjets are positive samples, while grids containing only operative inkjets are negative samples. The precision score represents how many of the grids predicted as containing inoperative inkjets actually contain inoperative inkjets. The recall score shows how many grids predicted as containing inoperative inkjets are detected by the MCMC model. The F1 score is the harmonic mean of the precision score and the recall score having a range of 0 to 1.

Figure 11:
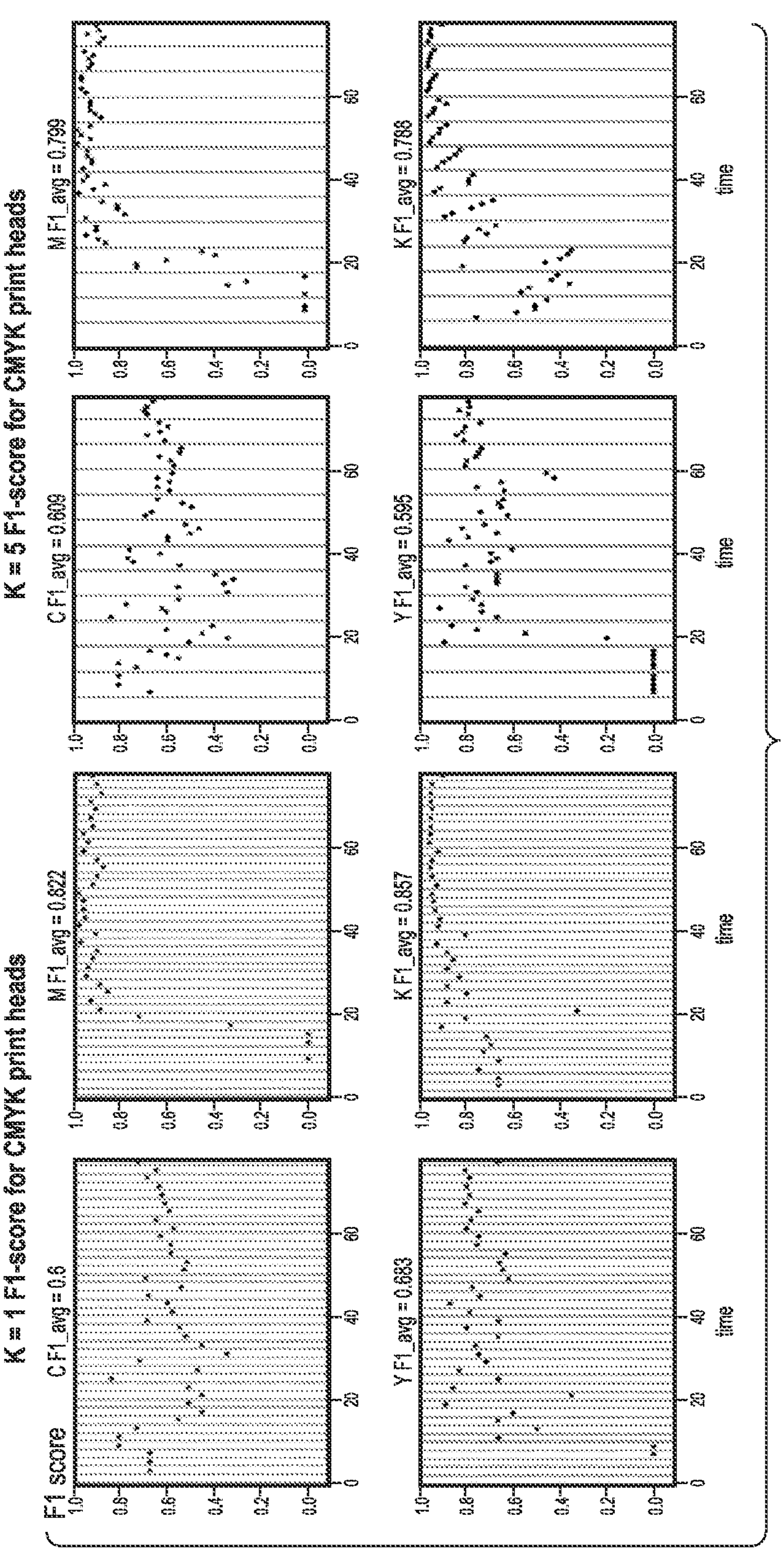
FIG. 11 shows how an evaluation score is generated for printheads ejecting different colors of ink at a predetermined resolution at each prediction time during a printing job.
Figure 12A:
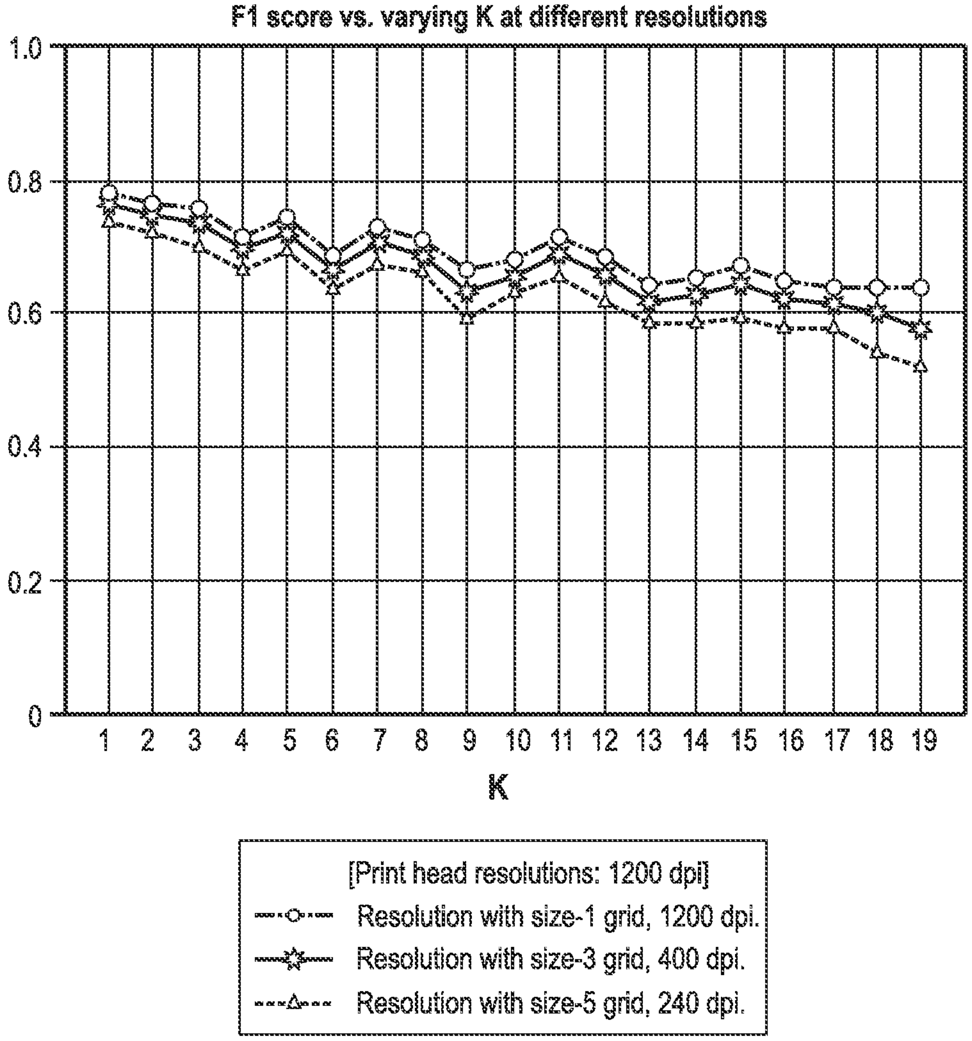
FIG. 12A shows a graph for average F1 scores across prediction times and FIG. 12B shows a graph for mean average precision (mAP) measurements across the prediction times.
Figure 12B:
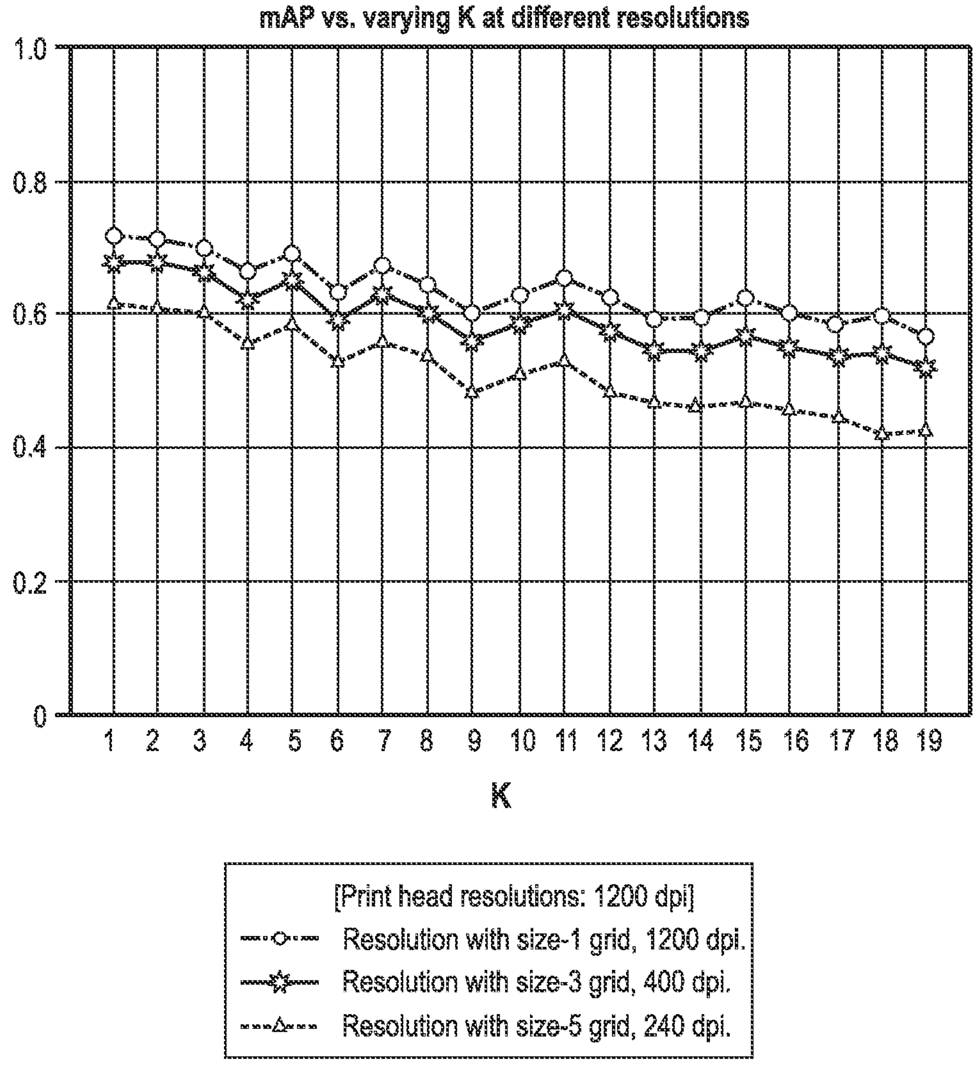

FIG. 11 shows the F1 score for four printheads (CMYK) with the original resolution at each prediction time during a printing job. The left-side of the figures has plots showing the results with K=1 and the right-side of the figure has plots showing the results with K=5. The vertical lines of the background in the plots are the times at which the ground truth is captured in the data and the F1 scores are not applicable. Additionally, at the start of a print job, no inoperative inkjets are in the printhead maps and the F1 score is not applicable at this time either, so the F1 score is labeled as being 0 at these times in the plots. From a visual comparison of these plots, the predictions in black and magenta achieve a higher F1 score on average, which implies that the locations of the inoperative inkjets may depend more on area coverage density for these two colors of printheads. Additionally, from this comparison, a larger K value negatively affects the model's performance. To optimize the value of K, the average F1 score is shown across prediction times in FIG. 12A and the mean average precision (mAP) is shown across prediction times in FIG. 12B. The different lines show the model's performance at different resolutions. As expected, a lower resolution results in more accurate results. On the other hand, when K is larger than 3, both the F1 score and the mAP appear to decrease more quickly. Thus, the optimal K is 3. In conclusion, two-thirds of the conventional inspection runs can be replaced by using the online MCMC model to locate inoperative inkjets on a 240-dpi printhead map with a F1 score of around 0.7.

The description of the MCMC model presented above demonstrates that prediction of inoperative inkjets at the printhead level and the nozzle level is possible. The main factors on which the model is predicted are area ink coverage distribution in the printed images and interactions of an inkjet with its neighboring inkjets. This model shows its predictive capability is adequate for the model to be used in an inkjet printer for scheduling inoperative inkjet detections and remedial actions when the predicted results indicate image quality is adversely affected. As noted above, the model can predict an inoperative inkjet within a 5×5 neighborhood with an F1 score of 0.7, although other grid sizes are possible.

FIG. 1A depicts a high-speed color inkjet printer 10 that is configured with programmed instructions stored in a memory operatively connected to the controller 80 that when executed implement a MCMC model that predicts the number and locations of inoperative inkjets in the printheads of the printer so the controller can determine whether image quality has been compromised to a degree that requires remedial maintenance action. As used in this document, the term "remedial action" means an operation performed on a printhead that restores inkjets in the printhead to operative status. As illustrated, the printer 10 is a printer that directly forms an ink image on a surface of a media sheet stripped from one of the supplies of media sheets $S_1$ or $S_2$ and the sheets S are moved through the printer 10 by the controller 80 operating one or more of the actuators 40 that are operatively connected to rollers or to at least one driving roller of conveyor 52 that comprises a portion of the media transport 42 that passes through the print zone PZ (shown in FIG. 1B) of the printer. In one embodiment, each printhead module has only one printhead that has a width that corresponds to a width of the widest media in the cross-process direction that can be printed by the printer. In other embodiments, the printhead modules have a plurality of printheads with each printhead having a width that is less than a width of the widest media in the cross-process direction that the printer can print. In these modules, the printheads are arranged in an array of staggered printheads that enables media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 10 is depicted with only two supplies of media sheets, the printer can be configured with three or more sheet supplies, each containing a different type or size of media.

Figure 1B:
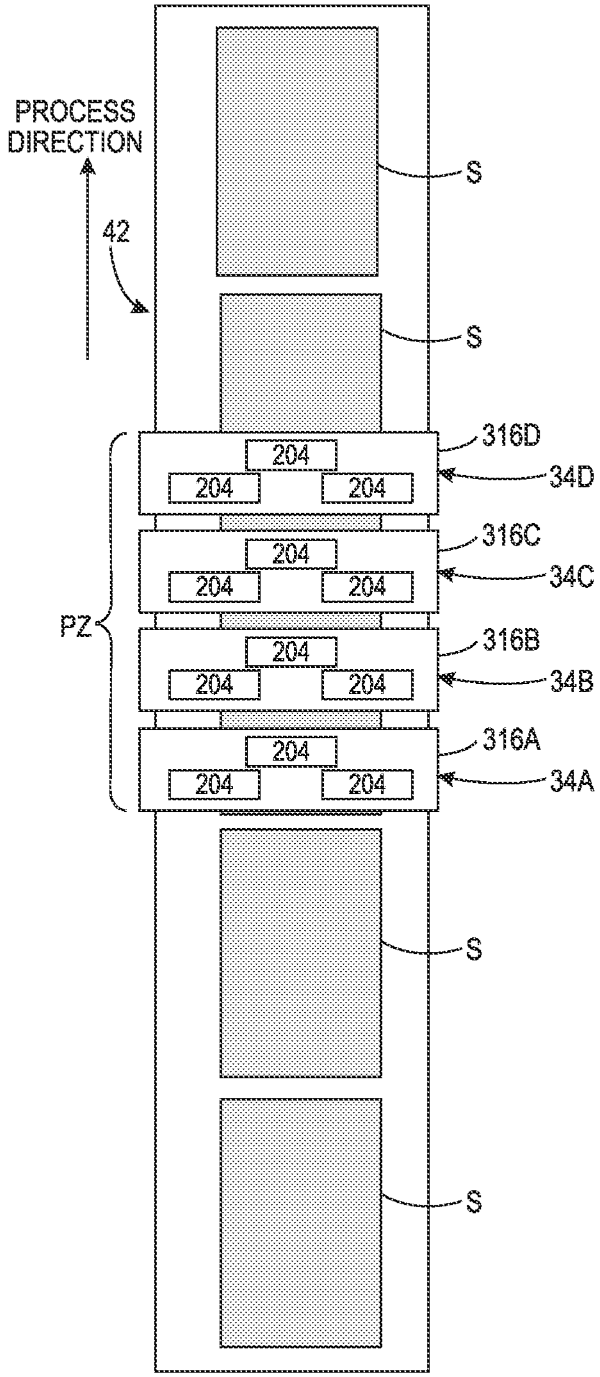
FIG. 1B is a diagram of a print zone in the printer of FIG. 1A.

The print zone PZ in the printer 10 of FIG. 1A is shown in FIG. 1B. The print zone PZ has a length in the process direction commensurate with the distance from the first inkjets that a sheet passes in the process direction to the last inkjets that a sheet passes in the process direction and it has a width that is the maximum distance between the most outboard inkjets on opposite sides of the print zone that are directly across from one another in the cross-process direction. Each printhead module 34A, 34B, 34C, and 34D shown in FIG. 1B has three printheads 204 mounted to one of the printhead carrier plates 316A, 316B, 316C, and 316D, respectively. The printheads of each module eject the same color of ink, which in the printer 10 means that the printheads of module 34A eject cyan ink, the printheads of module 3BA eject magenta ink, the printheads of module 34C eject yellow ink, and the printheads of module 34D eject black ink. The printheads 204 on the left side of the modules in the process direction are called the inboard printheads in this document, the printheads 204 on the right side of the modules in the process direction are called the outboard printheads in this document, and the printheads 204 between the inboard and the outboard printheads are called the center printheads.

As shown in FIG. 1A, the printed image passes under an image dryer 30 after the ink image is printed on a sheet S. The image dryer 30 can include an infrared heater, a heated air blower, air returns, or combinations of these components to heat the ink image and at least partially fix an image to the web. An infrared heater applies infrared heat to the printed image on the surface of the web to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer.

A duplex path 72 is provided to receive a sheet from the transport system 42 after a substrate has been printed and move it by the rotation of rollers in an opposite direction to the direction of movement past the printheads. At position 76 in the duplex path 72, the substrate can be turned over so it can merge into the job stream being carried by the media transport system 42. The controller 80 is configured to flip the sheet selectively. That is, the controller 80 can operate actuators to turn the sheet over so the reverse side of the sheet can be printed or it can operate actuators so the sheet is returned to the transport path without turning over the sheet so the printed side of the sheet can be printed again. Movement of pivoting member 88 provides access to the duplex path 72. Rotation of pivoting member 88 is controlled by controller 80 selectively operating an actuator 40 operatively connected to the pivoting member 88. When pivoting member 88 is rotated counterclockwise as shown in FIG. 1A, a substrate from media transport 42 is diverted to the duplex path 72. Rotating the pivoting member 88 in the clockwise direction from the diverting position closes access to the duplex path 72 so substrates on the media transport move to the receptacle 56. Another pivoting member 86 is positioned between position 76 in the duplex path 72 and the media transport 42. When controller 80 operates an actuator to rotate pivoting member 86 in the counterclockwise direction, a substrate from the duplex path 72 merges into the job stream on media transport 42. Rotating the pivoting member 86 in the clockwise direction closes the duplex path access to the media transport 42.

As further shown in FIG. 1A, the printed media sheets S not diverted to the duplex path 72 are carried by the media transport to the sheet receptacle 56 in which they are be collected. Before the printed sheets reach the receptacle 56, they pass by an optical sensor 84. The optical sensor 84 generates image data of the printed sheets and this image data is analyzed by the controller 80. The controller 80 is configured to identify inoperative inkjets in the printed images of test patterns on the RTMJ sheets inserted into a print job and generate a printhead map for each printhead in the print zone. The RTMJ sheets are discarded from the output of the print job. To identify the inoperative inkjets, the test pattern images are analyzed by the controller 80 to determine which inkjets, if any, that were operated to eject ink into the test pattern did in fact do so, and if an inkjet did eject an ink drop whether the drop landed at its intended position with an appropriate mass. Any inkjet not ejecting an ink drop it was supposed to eject or ejecting a drop not having the right mass or landing at an errant position is identified as an inoperative inkjet. The controller 80 generates a printhead map using the identified inoperative inkjets and generates an index using the printhead map. The index for the printhead map is compared to the indexes of clusters stored in database 92 operatively connected to the controller. The highest similarity score between the index of the printhead and one of the indexes stored in the dictionary 212 identifies the cluster most like the generated printhead map. The known causes and solutions stored in association with the index identified from the dictionary is used to diagnose issues in the printer 10 as described in more detail below. The optical sensor can be a digital camera, an array of LEDs and photodetectors, or other devices configured to generate digital image data of a passing surface. As already noted, the media transport also includes a duplex path that can turn a sheet over and return it to the transport prior to the printhead modules so the opposite side of the sheet can be printed. While FIG. 1A shows the printed sheets as being collected in the sheet receptacle, they can be directed to other processing stations (not shown) that perform tasks such as folding, collating, binding, and stapling of the media sheets.

Operation and control of the various subsystems, components and functions of the machine or printer 10 are performed with the aid of a controller or electronic subsystem (ESS) 80. The ESS or controller 80 is operatively connected to the components of the printhead modules 34A-34D (and thus the printheads), the actuators 40, and the dryer 30. The ESS or controller 80, for example, is a self-contained computer having a central processor unit (CPU) with electronic data storage, and a display or user interface (UI) 50. The ESS or controller 80, for example, includes a sensor input and control circuit as well as a pixel placement and control circuit. In addition, the CPU reads, captures, prepares, and manages the image data flow between image input sources, such as a scanning system or an online or a work station connection (not shown), and the printhead modules 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, ink image content data for an ink image to be produced is sent to the controller 80 from either a scanning system or an online or work station connection. The ink image content data is processed to generate the inkjet ejector firing signals delivered to the printheads in the modules 34A-34D. Along with the ink image content data, the controller receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer. As used in this document, the term "print job parameters" means non-image content data for a print job and the term "ink image content data" means digital data that identifies a color and a volume of each pixel that forms an ink image to be printed on a media sheet.

Figure 13:
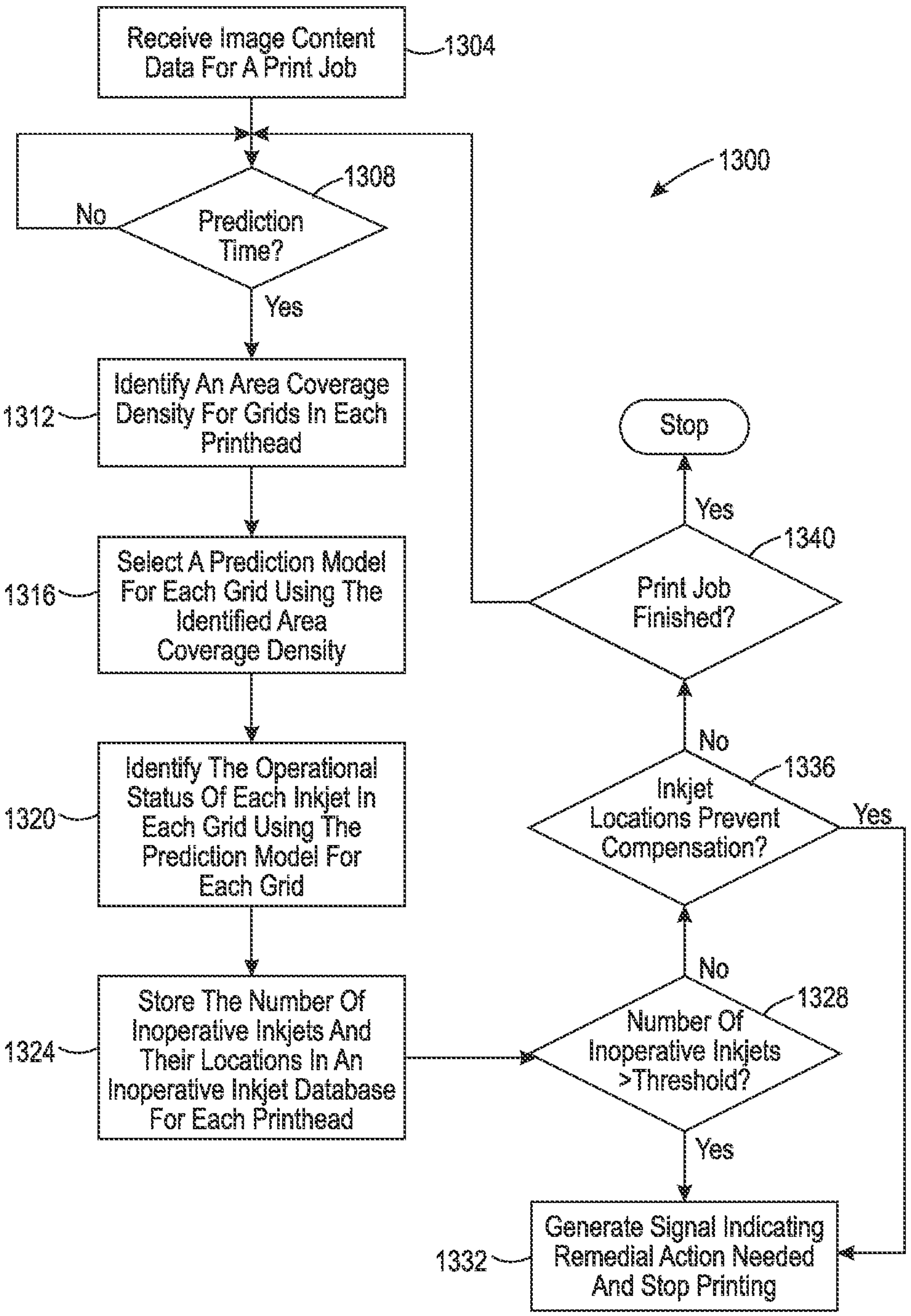
FIG. 13 is a flow diagram of a process used by the controller of the inkjet printer of FIG. 1A to predict the occurrences of inoperative inkjets to determine the compensation schemes and when remedial printhead maintenance should be performed before image quality is adversely impacted.

A process 1300 for using a predictive MCMC model to identify the number and locations of inoperative inkjets in the printheads of a printer is shown in FIG. 13. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 80 noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

The process 1300 begins by receiving image content data for a print job (block 1304). At a predetermined prediction time (block 1308), the process identifies the area coverage density for a predetermined number of grids in each printhead from the image content data used to operate the inkjets in the printheads to form ink images on media from a previous time in the print job to the predetermined prediction time (block 1312). The identified area coverage density for each grid is used to select a prediction model (block 1316). The selected prediction model uses the operational status for each inkjet in the grid at the previous time in the print job to identify an operational status for each inkjet in the grid at the predetermined prediction time and the location of each predicted inoperative inkjet (block 1320). The number and the locations of the predicted inoperative inkjets in a printhead are stored in an inoperative inkjet database (1324). If the number of inoperative inkjets exceeds a predetermined threshold (1328), a signal is generated that remedial printhead maintenance, such as purging, is needed and printing is stopped (block 1332). Additionally, if the locations of the inoperative inkjets prevent the implementation of inoperative inkjet compensation schemes (block 1336), a signal is generated that remedial printhead maintenance, such as purging, is needed and printing is stopped (block 1332). The process determines if print job is finished (block 1340) and, if it is, the process halts. Otherwise, the process continues until the next prediction time occurs (block 1308). As used in this document, the term "inoperative inkjet compensation schemes" means techniques used to distribute the ink drop ejections from an inoperative inkjet to operative inkjets neighboring the inoperative inkjet.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed:

1. A method of operating an inkjet printer comprising:
predicting a number of inoperative inkjets and locations of the inoperative inkjets in at least one printhead in the inkjet printer at a predetermined time; and
generating a signal indicating the at least one printhead requires remedial action when the number of predicted inoperative inkjets exceeds a predetermined threshold or the locations of the inoperative inkjets prevent implementation of inoperative inkjet compensation.

2. The method of claim 1 further comprising:
identifying an area coverage density for each grid in a plurality of grids of the at least one printhead;
selecting a prediction model from a plurality of prediction models for each grid using the identified area coverage density for each grid; and
predicting the number of inoperative inkjets and the locations of the inoperative inkjets in the at least one printhead using the selected prediction models.

3. The method of claim 2 wherein each grid has a same area.

4. The method of claim 3, the plurality of prediction models from which the selection of the prediction model is made further comprising:
a prediction model for an identified area coverage density of zero percent up to twenty-five percent of the area of the grid;
a prediction model for an identified area coverage density of twenty-five percent up to fifty percent of the area of the grid;
a prediction model for an identified area coverage density of fifty percent up to seventy-five percent of the area of the grid; and
a prediction model for an identified area coverage density of seventy-five percent to one hundred percent of the area of the grid.

5. The method of claim 4 wherein each prediction model is a Markov chain Monte Carlo (MCMC) model.

6. The method of claim 5 wherein each MCMC model is trained using digital image data of at least one ink image previously printed by the at least one printhead.

7. The method of claim 6 wherein each MCMC model uses a probability threshold to predict the number of inoperative inkjets and the locations of the inoperative inkjets in grids.

8. The method of claim 7 wherein the probability threshold is 0.5.

9. The method of claim 8 wherein the area of the grid corresponds to a 5 by 5 pattern of inkjets.

10. The method of claim 1 further comprising:

halting operation of the at least one printhead when the number of inoperative inkjets in the at least one printhead exceeds the predetermined threshold.

11. An inkjet printer comprising:

at least one printhead having a plurality of inkjets; and a controller operatively connected to the printhead, the controller being configured to:

predict a number of inoperative inkjets and locations of the inoperative inkjets in at least one printhead in the inkjet printer at a predetermined time; and generate a signal indicating the at least one printhead requires remedial action when the number of predicted inoperative inkjets exceeds a predetermined threshold or the locations of the inoperative inkjets prevent implementation of inoperative inkjet compensation.

12. The inkjet printer of claim 11, the controller being further configured to:

identify an area coverage density for each grid in a plurality of grids of the at least one printhead;

select a prediction model from a plurality of prediction models for each grid using the identified area coverage density for each grid; and predict the number of inoperative inkjets and the locations of the inoperative inkjets in the at least one printhead using the selected prediction models.

13. The inkjet printer of claim 12 wherein each grid has a same area.

14. The inkjet printer of claim 13, the controller being further configured to select the prediction model from:

a prediction model for an identified area coverage density of zero percent up to twenty-five percent of the area of the grid;

a prediction model for an identified area coverage density of twenty-five percent up to fifty percent of the area of the grid;

a prediction model for an identified area coverage density of fifty percent up to seventy-five percent of the area of the grid; and a prediction model for an identified area coverage density of seventy-five percent to one hundred percent of the area of the grid.

15. The inkjet printer of claim 14 wherein each prediction model is a Markov chain Monte Carlo (MCMC) model.

16. The inkjet printer of claim 15 wherein each MCMC model is trained using digital image data of at least one ink image previously printed by the at least one printhead.

17. The inkjet printer of claim 16 wherein each MCMC model uses a probability threshold to predict the number of inoperative inkjets and the locations of the inoperative inkjets in grids.

18. The inkjet printer of claim 17 wherein the probability threshold is 0.5.

19. The inkjet printer of claim 18 wherein the area of the grid corresponds to a 5 by 5 pattern of inkjets.

20. The inkjet printer of claim 11, the controller being further configured to:

halt operation of the at least one printhead when the number of inoperative inkjets in the at least one printhead exceeds the predetermined threshold.

* * * * *